US009309879B2

(12) United States Patent
Schmidt et al.

(10) Patent No.: US 9,309,879 B2
(45) Date of Patent: Apr. 12, 2016

(54) MICROSYSTEM FOR FLUIDIC APPLICATIONS, AND PRODUCTION METHOD AND USAGE METHOD FOR A MICROSYSTEM FOR FLUIDIC APPLICATIONS

(75) Inventors: Manuela Schmidt, Filderstadt-Sielmingen (DE); Martina Daub, Weissach (DE); Jochen Rupp, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 1039 days.

(21) Appl. No.: 13/368,751

(22) Filed: Feb. 8, 2012

(65) Prior Publication Data

US 2012/0214254 A1 Aug. 23, 2012

(30) Foreign Application Priority Data

Feb. 9, 2011 (DE) ........................ 10 2011 003 856

(51) Int. Cl.

| | |
|---|---|
| ***G01N 1/28*** | (2006.01) |
| ***B32B 37/06*** | (2006.01) |
| ***B32B 37/02*** | (2006.01) |
| ***B01L 3/00*** | (2006.01) |
| ***B23P 17/04*** | (2006.01) |
| ***F04B 43/04*** | (2006.01) |
| ***F04B 19/00*** | (2006.01) |

(52) U.S. Cl.

CPC ........... *F04B 43/043* (2013.01); *B01L 3/50273* (2013.01); *B01L 3/502707* (2013.01); *B01L 3/502738* (2013.01); *F04B 19/006* (2013.01); *B01L 2200/0689* (2013.01); *B01L 2300/0816* (2013.01); *B01L 2300/123* (2013.01); *B01L 2400/0481* (2013.01); *B01L 2400/0655* (2013.01); *Y10T 29/494* (2015.01); *Y10T 436/25* (2015.01)

(58) Field of Classification Search

CPC .......... B01L 3/502707; B01L 3/50273; B01L 3/502738; B01L 2200/0689; B01L 2300/0816; B01L 2300/123; B01L 2400/0481; B01L 2400/0655; F04B 19/006; F04B 43/043; Y10T 29/494; Y10T 436/25

See application file for complete search history.

(56) References Cited

U.S. PATENT DOCUMENTS

| | | | | |
|---|---|---|---|---|
| 5,593,290 | A | 1/1997 | Greisch et al. | |
| 5,932,799 | A | 8/1999 | Moles | |
| 7,445,926 | B2 * | 11/2008 | Mathies .................... | B01F 5/10 137/833 |
| 8,778,282 | B2 * | 7/2014 | Jung ................ | B01L 3/502738 251/334 |

(Continued)

FOREIGN PATENT DOCUMENTS

| | | | |
|---|---|---|---|
| CN | 101282789 | A | 10/2008 |
| CN | 101452003 | A | 6/2009 |

(Continued)

*Primary Examiner* — Christopher A Hixson
(74) *Attorney, Agent, or Firm* — Maginot, Moore & Beck LLP

(57) ABSTRACT

A microsystem for fluidic applications includes a substrate with a reservoir, a first microchannel, connected to the reservoir, and a second microchannel, separated from the first microchannel by a fixed member. The microsystem furthermore has an elastic film on the substrate, which film has a joint to the substrate around the reservoir and seals the reservoir. Here, the joint has a permanent joining area and, on the fixed member, a fixed member joining area that can be broken open and adjoins the permanent joining area at both ends of the fixed member. Such a microsystem forms a processing chip with reagent receptacle.

15 Claims, 7 Drawing Sheets

(56) References Cited

U.S. PATENT DOCUMENTS

| | | | |
|---|---|---|---|
| 8,795,607 B2 * | 8/2014 | Kurowski ......... B01L 3/502715 137/68.23 |
| 2002/0081222 A1 | 6/2002 | Karp |
| 2003/0215342 A1 | 11/2003 | Higashino et al. |
| 2004/0051154 A1 | 3/2004 | Yamakawa et al. |
| 2006/0057030 A1 | 3/2006 | Lee et al. |
| 2006/0076068 A1 | 4/2006 | Young et al. |

FOREIGN PATENT DOCUMENTS

| | | | |
|---|---|---|---|
| CN | 101588838 | A | 11/2009 |
| JP | 2005-283331 | A | 10/2005 |
| JP | 2006-212473 | A | 8/2006 |
| WO | 2009/156045 | A2 | 12/2009 |

* cited by examiner

MICROSYSTEM FOR FLUIDIC APPLICATIONS, AND PRODUCTION METHOD AND USAGE METHOD FOR A MICROSYSTEM FOR FLUIDIC APPLICATIONS

This application claims priority under 35 U.S.C. §119 to German patent application no. 10 2011 003 856.6, filed on Feb. 9, 2011 in Germany, the disclosure of which is incorporated herein by reference in its entirety.

BACKGROUND

The present disclosure relates to a microsystem for fluidic applications, and to a corresponding production method and usage method for a microsystem for fluidic applications.

Reagent liquids must be introduced into microfluidic systems, as are used, for example, for diagnostics or analytics. Ideally, these microsystems are sterile disposable products and therefore usually consist of plastics.

The usual procedure according to the prior art is to supply the reagent liquids while a reaction protocol (assay) progresses. This supply is brought about via external instruments such as e.g. syringe pumps, which are connected to the microfluidic system via tubing. Another option consists of adding the liquids to wells by pipetting, said wells being small pots attached to the channel openings. There have been proposals to present liquid reagents in the microfluidic system. Here, the liquids are, in advance, stored in glass ampoules, which are inserted into the microchannel. These ampoules are mechanically destroyed while the assay progresses and thus they are emptied. Metering reagent liquids from the outside is dependent on the user and/or the equipment, and is subjected to the influence of errors, variations in volume, contamination of the liquid and the supply of the wrong reagents.

US 2006/0076068 describes options for using a membrane as a valve or pump in a microsystem.

SUMMARY

The disclosure is based on a multi-layered design made up of a stiff, dimensionally stable flat substrate and an elastic, moveable membrane or film. The substrate contains at least one recess for holding reagents in liquid form and, separated therefrom by a predetermined breaking point, a microchannel for draining the reservoir. The recess is sealed by means of an elastic membrane. The deflection of the membrane into the recess displaces the liquid in the direction of the drainage channel, as a result of which increased liquid pressure is generated in the channel region in the vicinity of the predetermined breaking point by the membrane being deflected upward at said location.

The predetermined breaking point is embodied such that it breaks if a critical pressure is exceeded. This effect can be achieved by various techniques, like e.g. by means of film welding by using specific welding parameters or by specific geometries of the joint seam or joint zone. This also affords the possibility of arranging a plurality of reservoirs in a system, which reservoirs burst at different critical pressures. The membrane deflection for draining the reservoir can be brought about by e.g. mechanical, thermal or pneumatic principles. A fluidic connection to the drainage channel is established by destroying the predetermined breaking point and the reservoir can be drained.

The disclosure contains a method for enclosing the reagent liquid during the production process of a microfluidic system. Furthermore, the disclosure enables the targeted opening and the subsequent complete and active drainage of the liquid reservoir at a specific time during the assay progression.

A substantial advantage of the disclosure lies in avoiding the storage of large amounts of liquid in external containers, which are connected to the microfluidic system, and the sterility problems associated therewith, up to and including subsequent falsifying of the analysis results.

Further advantages of the disclosure include that the described production method with polymer materials and laser welding enables the economic production of disposable microsystems for the considered applications.

The liquid can be stored in a protected, sealed form. The volume can be presented during the production process in a quality-controlled fashion, i.e. with a precise volume. The reservoir is only opened precisely at the usage time, as a result of which influences of errors on the assay progression, resulting from transportation or user influences, are minimized. The reservoir is situated precisely at the location in the microfluidic system where it is used, and so dead volumes are minimized. This avoids contamination and increases the metering accuracy compared to syringe pumps connected to the microsystem by tubing. The user does not come into contact with the reagents, as a result of which hygiene is improved. High user friendliness is achieved and time is saved compared to pipetting as a result of the active drainage of the reservoir. Furthermore, savings are made in manual work steps, e.g. during laser welding. An adequate production method also allows thermally sensitive reagents to be sealed in. Insertion parts, such as e.g. glass ampoules, are avoided. Moreover, an additional packaging step for the reagent liquid is avoided.

DETAILED DESCRIPTION

Figure 1A:
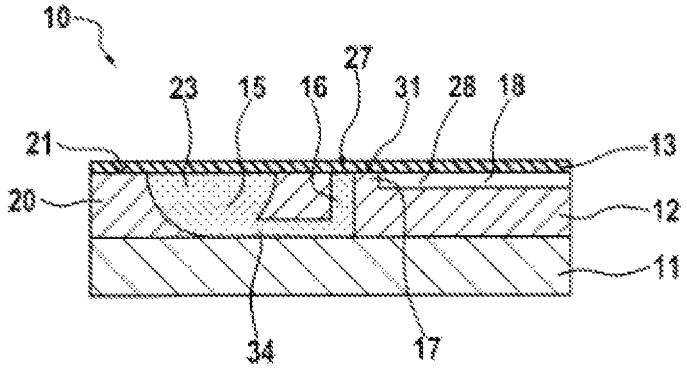
FIGS. 1A-D show a schematic illustration of a section of a microsystem according to an embodiment of the present disclosure, in a longitudinal section in parts A, C and in a plan view in parts B, D, respectively with an intact fixed member joining area in parts A, B and a broken-open fixed member joining area in parts C, D.
Figure 1B:
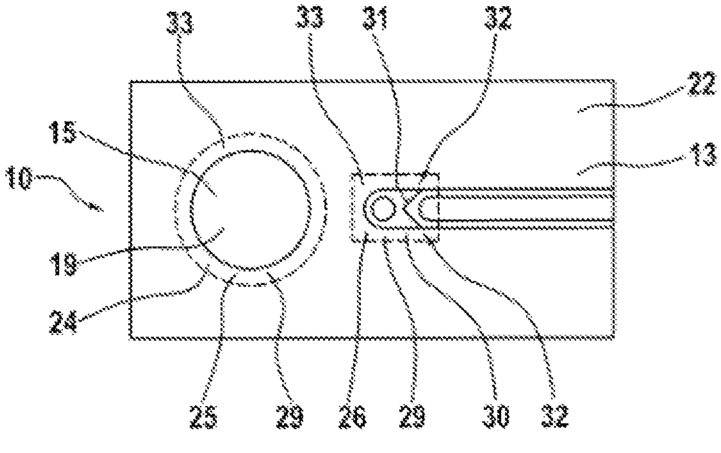
Figure 1C:
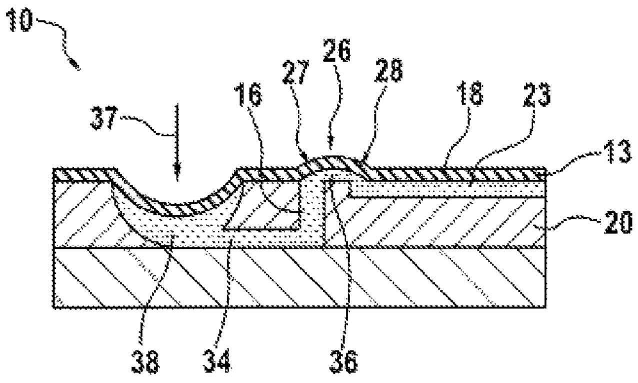
Figure 1D:
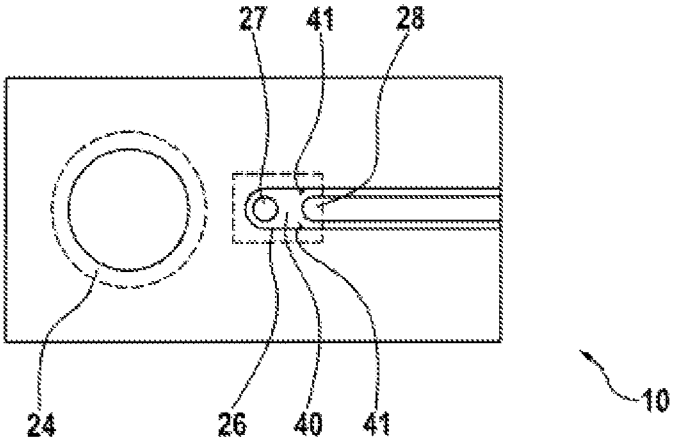
Figure 2A:
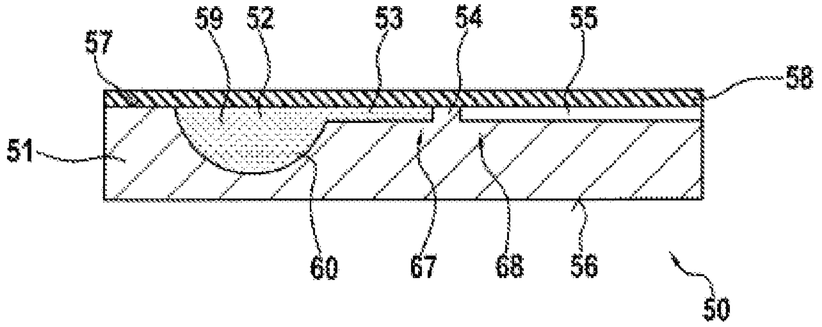
FIGS. 2A-D show a schematic illustration of a section of a microsystem according to another embodiment of the present disclosure, once again in a longitudinal section in parts A, C and in a plan view in parts B, D, respectively with an intact fixed member joining area in parts A, B and a broken-open fixed member joining area in parts C, D.
Figure 2B:
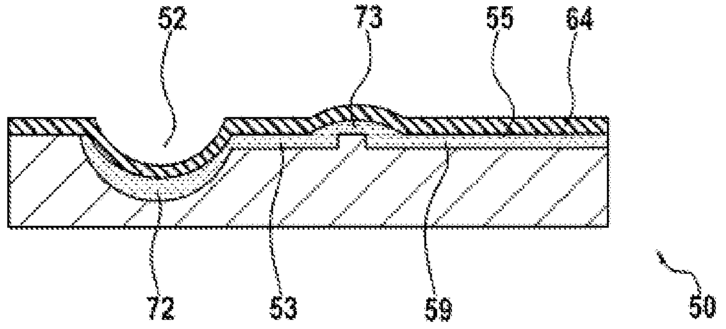
Figure 2C:
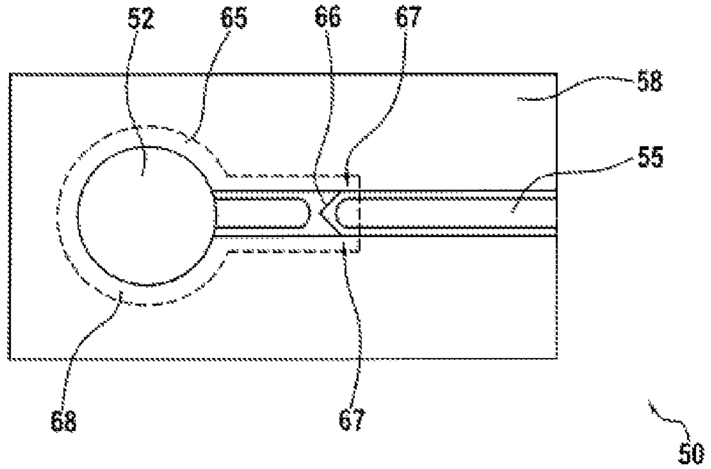
Figure 2D:
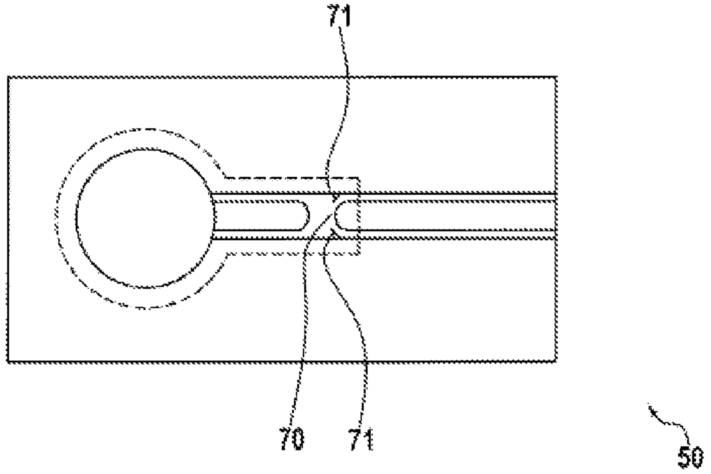

FIG. 1 shows the structure and the functionality of a microsystem according to an embodiment of the present disclosure using a section of the microsystem 10. Part A shows the layered design of the substantially areal microsystem 10 with a base substrate layer 11, a fluidic substrate layer 12 lying on the base substrate layer 11 and an elastic film 13 lying on the fluidic substrate layer 12. The base substrate layer 11 is unstructured and serves as a stable substrate. The fluidic substrate layer 12 contains components of a fluidic network.

The illustrated section has a reservoir 15, a first microchannel 16, connected to the reservoir 15, and a second microchannel 18, separated from the first microchannel 16 by a fixed member 17. Further components of a fluidic network join the second microchannel 18 outside of the illustrated section. The base substrate layer 11 and the fluidic substrate layer 12 together form a substrate 20. The substrate 20 has a surface 21, which adjoins the film 13. Adjoining the surface 21 are: substrate material in the region 22, an opening 19 of the reservoir 15, an end 27 of the first microchannel 16 facing away from the reservoir 15 and the second microchannel 18. The reservoir 15 and the first microchannel 16 are filled with a reagent liquid 23. The second microchannel 18 is not necessarily filled with a reagent liquid.

Part B of FIG. 1 now explains how the film 13 is joined to the substrate 20. The film 13 is areally connected to the substrate 20 in the region 22. The film 13 forms an elastic first film section 24 on the substrate 20, which film section seals the reservoir 15 with the substrate 20 by means of a permanent continuous surrounding joining area 25. The film 13 forms an elastic second film section 26 on the substrate 20, which film section covers the fixed member 17 and ends 27, 28 of the first and second microchannel 16, 18. On its circumference, the second film section 26 has a permanent joining area 30 with the substrate 20 and, on the fixed member 17, it has a fixed member joining area 31 with the substrate 20, which fixed member joining area can be broken open and adjoins the permanent joining area 30 at both ends 32 of the fixed member 17.

The first microchannel 16 runs between the reservoir 15 and the end 27 not at the surface 21 of the substrate. The reservoir 15 and the first microchannel 16 connected thereto are filled with the reagent liquid 23. Together they form the connected cavity 34, which is completely surrounded by the substrate 20, the first film section 24 and the second film section 26. As a result of the continuous surrounding joining area 25 of the first film section 24, the opening 19 of the reservoir 15 is sealed. As a result of the permanent joining area 30 and the fixed member joining area 31 of the second film section 26 connected thereto, the away-facing end 27 of the first microchannel 16 is sealed. It follows that the connected cavities 34 are sealed by means of the film sections 24 and 26.

Even outside of the illustrated section, the film 13 is connected to the substrate 20 such that the film 13 covers the second microchannel 18. Thus the second microchannel 18 does not have an opening to the outside. The permanent joining areas 25 and 30 are combined as permanent joining area 29. Hence, the film 13 on the substrate 20 has a joint 33 to the substrate 20 around the reservoir 15 and seals the reservoir 15, the joint 33 having the permanent joining area 29 and, on the fixed member 17, the fixed member joining area 31 that can be broken open and adjoins the permanent joining area 29 at both ends of the fixed member 17.

The functionality of the section of the microsystem 10 is now explained using parts C and D of FIG. 1. Initially, the elastic first film section 24 is pressed into the reservoir 15; this is represented by the arrow 37. As a result, a liquid volume of the reagent liquid 23 is displaced from the connected cavities 34 and presses against the elastic second film section 26, bringing about the deformation thereof. In the process, a displacement cavity is formed under the second film section 26 in the region of the end 27 of the first microchannel 16, which takes up the displaced reagent liquid 23. Once there is a sufficient deformation of the second film section 26, the joint 33 between substrate 20 and the film 13 breaks at the fixed member joining area 31 that can be broken open. A cavity 36 is formed over the fixed member 17 and the ends 27, 28 of the first and second microchannel 16, 18, and the reagent liquid 23 flows therethrough from the first microchannel 16 into the second microchannel 18.

Parts C and D of FIG. 1 now show the state of the section of the microsystem 10 after breaking open the fixed member joining area 31. The film 13 has been pressed into the reservoir 15 in the direction of the arrow 37. The fixed member joining area 31 has been broken open in the middle 40, with remaining remains 41. The reagent liquid 23 now only still fills a reservoir part 38 of the reservoir 15, but fills the first microchannel 16, the cavity 36 and the second microchannel 18.

In this embodiment, the fixed member joining area 31 that can be broken open has the shape of an arrowhead in the direction of the first microchannel 16. This aids the defined breaking open of the fixed member joining area 31 that can be broken open in the function thereof as a predetermined breaking point.

In this embodiment, the substrate 20 has a fluidic substrate layer 12, which adjoins the film sections 24 and 26 and has a fluidic structure, and a base substrate layer 11 as a cover layer, which lies opposite the film sections 24 and 26. As a result, the entire thickness of the fluidic substrate layer 12 can be utilized for cavities such as the reservoir 15 and the first microchannel 16. This simplifies the production of microsystems since all cavities adjoining the cover layer are delimited by the cover layer.

The film 13, and hence the first and second film section 24, 26, preferably has an elastic polymer, e.g. a polyurethane. The substrate 20 preferably has a thermoplastic polymer, e.g. polycarbonate. Advantageous volumes of the recess—of the reservoir 15—are 1 μl to 500 μl. In addition to the polymers, material combinations of dimensionally stable and elastic substrates, which can be interconnected locally by a suitable production method, e.g. ultrasound welding, adhesive bonding, laser welding, microwave welding, are also possible.

The microsystem 10 according to the disclosure forms a processing chip with reagent receptacle. As a result of pressing in the film 13 in a defined fashion and breaking open the seal of the connected cavities using reagent liquid 23, it is possible, either once or repeatedly, to supply a defined amount of the reagent liquid 23 into the second microchannel 18, and hence to any points in the fluidic system.

FIG. 2 shows, in a longitudinal section, a section of a microsystem 50 according to another embodiment of the present disclosure; here, the fixed member joining area is intact in part A and the fixed member joining area is broken open in part B.

In contrast to the microsystem 10 from FIG. 1, the microsystem 50 has a single layer of the substrate 51. The substrate 51 has a reservoir 52, a first microchannel 53, connected to the reservoir 52, and a second microchannel 55, separated from the first microchannel 53 by a fixed member 54. None of the cavities of the fluidic network adjoin the lower side 56 of the substrate 51; rather, they all adjoin the upper side 57, which is adjoined by a film 58.

Thus, the first microchannel 53 runs from the reservoir 52 to the fixed member 54 on the upper side 57 of the substrate 51. The reservoir 52 and the first microchannel 53 connected thereto are filled with the reagent liquid 59. They form the connected cavity 60 on the upper side 57. The elastic film 58 seals the reservoir and covers the fixed member 54 and ends 67, 68 of the first and second microchannel 53, 55. The elastic film 58 has a permanent joining area 65 with the substrate 51 around the reservoir 52 and, on the fixed member 54, a fixed member joining area 66 that can be broken open with the substrate and adjoins the permanent joining area 65 at both ends 67, 68 of the fixed member 54. The permanent joining area 65 and the fixed member joining area 66 that can be broken open form a joint with the substrate 51 around the reservoir 52, which joint seals the reservoir 52. Provision can advantageously be made for a ram-actuation to drain the reservoir 52 in this embodiment, in which the reservoir 52 and the connection to the drainage channel 55 are arranged on a face of the substrate 51.

Parts C and D of FIG. 2 now show the state of the section of the microsystem 50 after breaking open the fixed member joining area 66. The film 58 has been pressed into the reservoir 52. The fixed member joining area 66 has been broken open in the middle 70, with remaining remains 71. The reagent liquid 59 now only still fills a reservoir part 72 of the reservoir 52, but fills the first microchannel 53, the cavity 73 and the second microchannel 55.

Figure 3A:
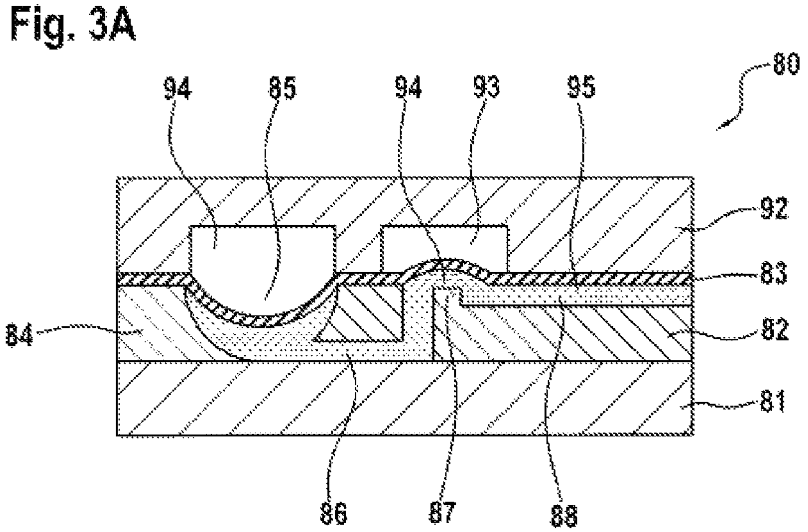
FIGS. 3A-C show a schematic illustration of a section of a microsystem according to another embodiment of the present disclosure with a broken-open fixed member joining area in a side view in part A and a plan view in part B, with a magnification of a section in part C.
Figure 3B:
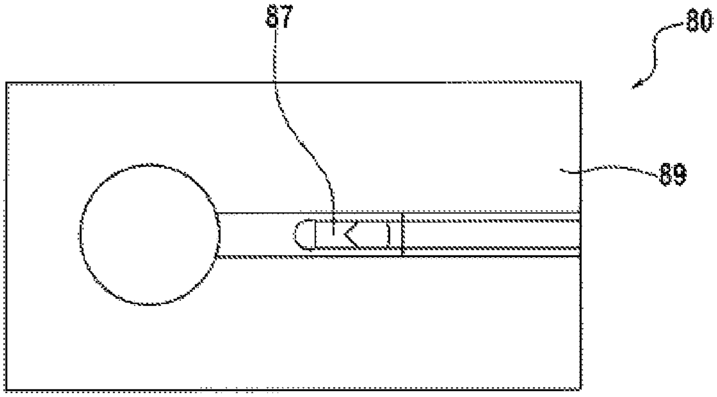
Figure 3C:
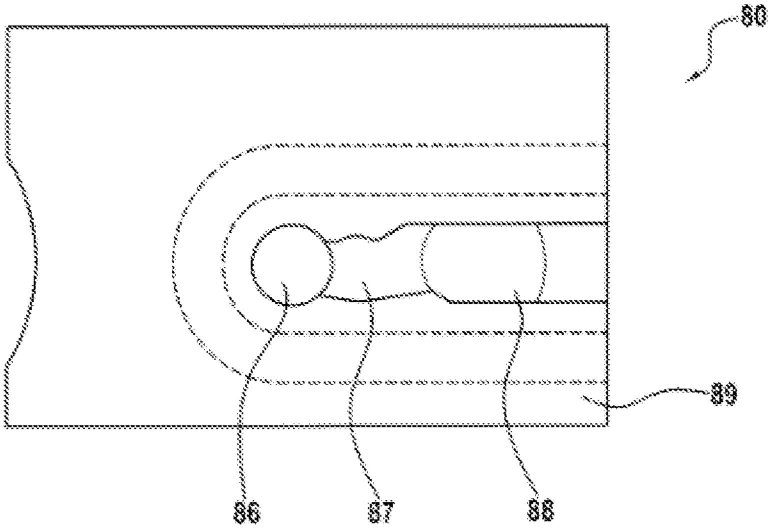

FIG. 3 shows a microsystem 80 according to a further embodiment of the present disclosure, with a broken-open fixed member joining area. Like the microsystem 10 from FIG. 1, the microsystem 80 has a base substrate layer 81, a fluidic substrate layer 82, lying on the base substrate layer 81, and an elastic film 83, lying on the fluidic substrate layer 82. The base substrate layer 81 and the fluidic substrate layer 82 form the substrate 84.

The illustrated section once again has a reservoir 85, a first microchannel 86, connected to the reservoir 85, and a second microchannel 88, separated from the first microchannel 86 by a fixed member 87. Further components of a fluidic network adjoin the second microchannel 88 outside of the illustrated section. The film 83 has a permanent joining area 89 with the substrate 84 and, with the substrate 84, has a fixed member joining area that can be broken open, illustrated here in the broken-open state, and adjoins the permanent joining area 89 at both ends of the fixed member 87.

In contrast to the microsystem 10 from FIG. 1, microsystem 80 has a protective layer 92 that adjoins the film 83, lies opposite the substrate 84, has a recess 93 in the region of the joining area that can be broken open at the fixed member 87 and has a recess 94 in the region of the reservoir 85. The protective layer 92 firstly protects the film 83 from damage and offers protection against emerging reagent liquid 95 if the film 83 rips in region of the reservoir 85 or on the fixed member 87. The recess 94 only locally permits a deflection of the membrane or film 83. The deflection of the elastic membrane or film 83 then leads to the destruction of the complete joint in this region and the formation of a fluid connection between the first microchannel 86 and the second microchannel 88.

Part C of FIG. 3 illustrates, in a magnified fashion, how the fixed member joining area of the film 83 has been broken open at the fixed member 87. A cavity is formed above the fixed member 87 and the ends of the first and second microchannel 86, 88 and reagent liquid 95 flows therethrough from the first microchannel 86 into the second microchannel 88.

A microsystem 10, 50, 80 forms a processing chip with reagent receptacle.

Figure 4:
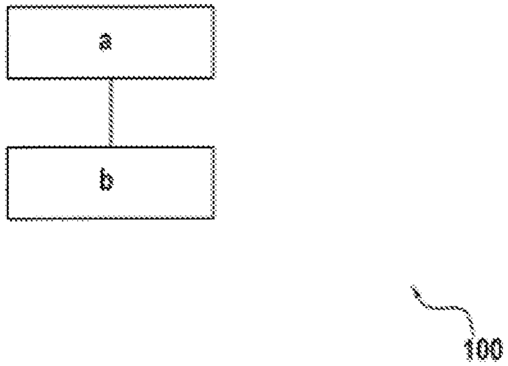
FIG. 4 shows a flowchart of the production method for a microsystem according to an embodiment of the present disclosure.

FIG. 4 shows a flowchart 100 of the production method for a microsystem 10, 50, 80 according to an embodiment of the present disclosure. The production method assumes a microsystem 10, 50, 80 for fluidic applications having a substrate 20, 51, 84 with a reservoir 15, 52, 85, a first microchannel 16, 53, 86, connected to the reservoir 15, 52, 85, and a second microchannel 18, 55, 88, separated from the first microchannel 16, 53, 86 by a fixed member. It starts with a), filling the reservoir 15, 52, 85 with a reagent liquid. This is followed by b), arranging the film 13, 64, 58, 83 on the substrate 20, 51, 84 and joining the former to the substrate 20, 51, 84 in an interlocking fashion, the film 13, 64, 58, 83 forming a joint with the substrate 20, 51, 84 around the reservoir 15, 52, 85, which joint, with the substrate 20, 51, 84, forms a joining area that separates the first microchannel from the second microchannel 16, 53, 86; 18, 55, 88 and can be broken open at the fixed member.

By way of example, the reservoir 15, 52, 85 is filled with the reagent liquid by means of a pipetting robot, which fills reagent liquid, e.g. PCR buffer, lysis buffer, washing buffer, elution buffer, into the reservoir 15, 52, 85.

The membrane or film 13, 58, 64, 83 is arranged over the substrate 20, 51, 84 and is welded in an interlocking fashion, as a result of which the reagent liquid is sealed in the reservoir 15, 52, 85. The joining takes place locally, preferably by means of laser welding, ultrasound welding, microwave welding or adhesive bonding along the contour of the reservoir 15, 52, 85. In the process, the joining area that can be broken open is produced as predetermined breaking point of the membrane or film 13, 64, 58, 83. The predetermined breaking point can be obtained by applying weaker joining parameters than during the permanent joining of the membrane, e.g. a thinner weld seam, or by a shape of the weld seam bringing about the concentration of mechanical stresses at a point.

Both options have been applied in the embodiments in FIGS. 1 to 3, namely, on the one hand, a narrow weld seam of the film 13, 64, 58, 83 on the fixed member in the case of a contiguous welding of the film 13, 64, 58, 83 to the substrate surface and, on the other hand, a weld seam of the film 13, 64, 58, 83 on the fixed member in the form of an arrowhead, which concentrates mechanical stresses at the tip.

Figure 5:
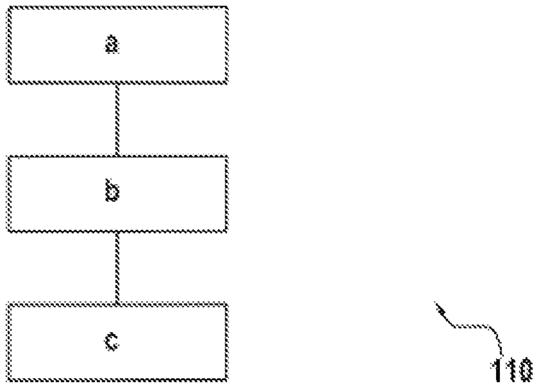
FIG. 5 shows a flowchart of the usage method for a microsystem according to an embodiment of the present disclosure.

FIG. 5 shows a flowchart 110 of the usage method for a microsystem 10, 50, 80 according to an embodiment of the present disclosure. The usage method assumes a microsystem 10, 50, 80 for fluidic applications having a substrate, which has a reservoir 15, 52, 85 filled with a reagent liquid, a first microchannel, connected to the reservoir 15, 52, 85, and a second microchannel, separated from the first microchannel by means of a fluidic barrier that can be broken open, the reservoir being sealed by an elastic film. It starts with a), deflecting of the film 13, 64, 58, 83 into the reservoir 15, 52, 85 and displacing reagent liquid from the reservoir 15, 52, 85. This is followed by b), breaking open the fluidic barrier that can be broken open. Now, this is followed by c), supplying reagent liquid from the reservoir 15, 52, 85 through the first microchannel 16, 53, 86, along the broken-open fluidic barrier and into the second microchannel 18, 55, 88.

The microsystem 10, 50, 80 preferably has an elastic film section, which covers ends of the first and second microchannel 16, 53, 86; 18, 55, 88 and a fixed member situated therebetween, the film 13, 64, 58, 83 forming a joint with the substrate around the reservoir, which joint has a joining area, which separates the first microchannel from the second microchannel 16, 53, 86; 18, 55, 88 and can be broken open at the fixed member, as a fluidic barrier with the substrate. The deflection of the film 13, 64, 58, 83 into the reservoir 15, 52, 85 is advantageously brought about by means of a control instrument.

What is claimed is:

1. A microsystem for fluidic applications comprising:

a substrate with a reservoir;

a first microchannel, fluidically connected to the reservoir;

a second microchannel, separated from the first microchannel by a fixed member;

a first elastic film section that is fixedly attached to the substrate around the reservoir so as to seal the reservoir; and a second elastic film section that is fixedly attached to the fixed member so as to form a breakable seal that can be broken open to fluidically connect the first microchannel with the second microchannel.

2. The microsystem according to claim 1, wherein the second elastic film section covers and seals the fixed member and ends of the first microchannel and of the second microchannel.

3. The microsystem according to claim 1, wherein the first elastic film section and the second elastic film section are sections of a single elastic film.

4. The microsystem according to claim 1, wherein the breakable seal between the second elastic film section and the fixed member has a shape of an arrowhead pointing in a direction of the first microchannel.

5. The microsystem according to claim 3, wherein the elastic film includes an elastic polymer.

6. The microsystem according to claim 1, wherein the substrate includes a thermoplastic polymer.

7. The microsystem according to claim 3, wherein the substrate includes:

a fluidic substrate layer that adjoins the elastic film and has a fluidic structure, and a cover layer lying opposite the elastic film.

8. The microsystem according to claim 3, further comprising:

a protective layer that adjoins the elastic film, lies opposite the substrate, and has a recess in a region of the breakable seal.

9. The microsystem according to claim 1, wherein the microsystem forms a processing chip with a reagent receptacle.

10. A production method for a microsystem for fluidic applications having a substrate with a reservoir, a first microchannel fluidically connected to the reservoir, and a second microchannel separated from the first microchannel by a fixed member, comprising:

filling the reservoir with a reagent liquid;

arranging a first elastic film section on the substrate;

fixedly attaching the first elastic film section to the substrate around the reservoir so as to seal the reservoir;

arranging a second elastic film section over at least the fixed member; and fixedly attaching the second elastic film section to the fixed member so as to form a breakable seal that can be broken open to form a fluidic connection between the first microchannel and the second microchannel.

11. The production method according to claim 10, wherein the fixedly attaching includes laser welding or ultrasound welding.

12. A usage method for a microsystem for fluidic applications having a substrate, which has a reservoir filled with a reagent liquid, a first microchannel fluidically connected to the reservoir, a second microchannel separated from the first microchannel by a fixed member, a first elastic film section fixedly attached to the substrate around the reservoir to seal the reservoir, and a second elastic film section fixedly attached to the fixed member so as to form a breakable seal that can be broken open in order form a fluidic connection between the first microchannel and the second microchannel, comprising:

deflecting the first elastic film section into the reservoir and displacing reagent liquid from the reservoir;

breaking open the breakable seal; and supplying reagent liquid from the reservoir through the first microchannel, along the broken-open fluidic connection and into the second microchannel.

13. The usage method according to claim 12, wherein:

the first elastic film section and the second elastic film section are parts of a single elastic film, which covers ends of the first microchannel and second microchannel and the fixed member situated therebetween.

14. The usage method according to claim 12, wherein the deflection of the first elastic film section into the reservoir is brought about via a control instrument or by hand.

15. The microsystem according to claim 1, wherein the breakable seal is configured to break open to fluidically connect the first microchannel with the second microchannel once pressure in the first microchannel exceeds a predetermined pressure threshold.

* * * * *